April 11, 1961  S. P. KELLER  2,979,467
INFRARED STIMULABLE PHOSPHORS
Filed June 30, 1958
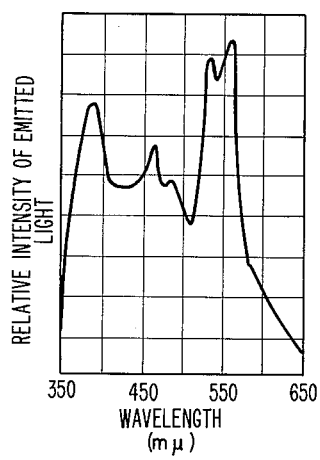
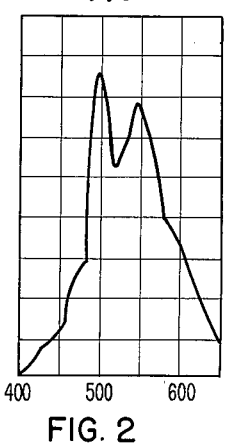
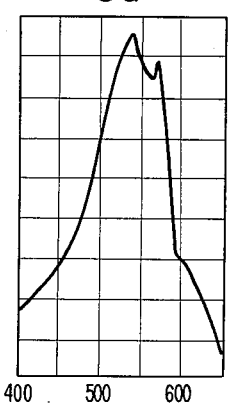
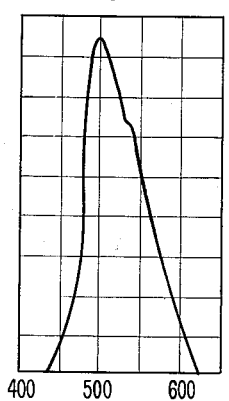
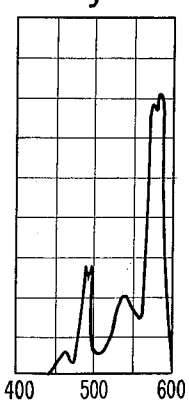
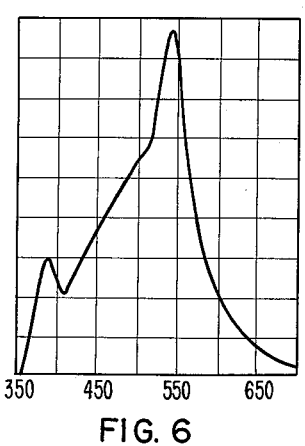
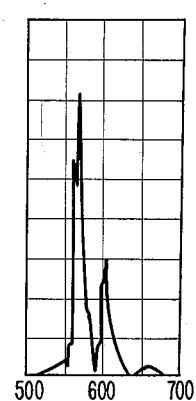
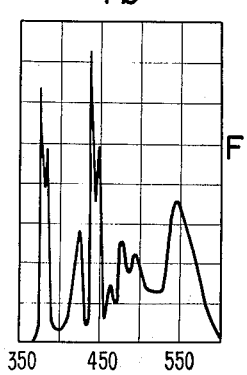
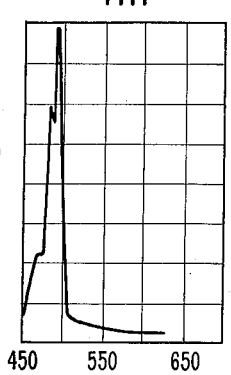
*INVENTOR.*
SEYMOUR KELLER
BY William J. Schelberg
AGENT

United States Patent Office 2,979,467
Patented Apr. 11, 1961

2,979,467

INFRARED STIMULABLE PHOSPHORS

Seymour P. Keller, Poughkeepsie, N.Y., assignor to International Business Machines Corporation, New York, N.Y., a corporation of New York Filed June 30, 1958, Ser. No. 745,720

6 Claims. (Cl. 252—301.4)

This invention relates to luminescent materials and, more particularly, to infrared stimulable phosphors which exhibit particular storage and emission characteristics.

Since the discovery that certain doubly activated alkaline earth phosphors have the property of producing an emission upon being stimulated by infrared radiation following excitation with UV light, as described in U.S. Patents 2,447,322 and 2,522,074, it has been desired to prepare new phosphor systems which would retain the basic storage attributes of these materials and also possess a range of spectral emission characteristics for selective use in application, especially in memory storage devices, such as those described in U.S. Patent 2,742,631. The memory cells described in the latter-mentioned patent employ infrared stimulable phosphors in conjunction with photo-conductive materials sensitive to the spectral response from the IR phosphors. The availability of a number of IR phosphors with stimulated emissions distributed over a wide spectral range permits the utilization of more suitable photo-conductive elements in such memory cells.

Previously certain activators have been incorporated into alkaline earth sulfides and other base materials to produce infrared stimulable phosphors. These activators have been classified as either one of two types; a primary activator such as Eu or Ce, or the secondary activator such as Sm. It had been thought that the primary activator determines the spectra of the excitation in the visible, while the secondary activator increases the storageability and determines the stimulation spectra.

According to the practice of this invention, new infrared storage phosphors have been provided which exhibit a wide range of stimulated emissions when excited by infrared radiation. The combinations of rare earth activators shown in this invention were selected after considerable investigation into the theory and mechanism of action of activated storage phosphors, as described in detail in a paper by S. P. Keller et al., in Phy. Rev., vol. 108, November 1, 1957, pages 663–676.

In the paper by Keller, it was shown that both activators help to determine the emission, just as the interplay of both activators determines the region of storage and storageability. This new mechanism has provided the means whereby other combinations of activators could be selected to provide phosphors having selective degrees of stimulability and selective emission responses to infrared radiation.

An object of this invention is to provide new and improved storage phosphors.

A further object of this invention is to provide doubly activated alkaline earth phosphors which exhibit stimulated emissions over a wide spectral range.

Still another object of this invention is to prepare alkaline earth phosphors doubly activated with rare earth elements which exhibit high stimulability.

Among the other objectives of this invention is to prepare phosphors having a wide range of fluorescent emission characteristics upon light excitation.

Other objects of the invention will be pointed out in the following description and claims, and illustrated in the accompanying drawings, which disclose, by way of example, the principle of the invention and the best mode which has been contemplated of applying that principle.

In the drawings:

The graphs of Figures 1–9 show the fluorescent emission spectra of several phosphors singly activated with rare earth ions.

The phosphors of the present invention may be prepared in the following manner. The base material such as SrS, is obtained in the pure form by firing $SrSO_4$ in $H_2$ at 1,000° C. for about one hour in a quartz boat lined with platinum. SrS thus prepared was free from detectable contamination by Cu or Al. The activators are then added to the base material as solutions. The fluxing materials such as NaCl or $CaF_2$ are then added. After drying in an oven at 75° C., the resulting powder is fired in a graphite boat at a $H_2$ atmosphere at 1100° C. for 1½ hours to form the phosphor. The activator concentration may vary over wide ranges though 0.005–0.5 mole percent has been found to be quite satisfactory.

The optical properties of SrS phosphors, doubly activated with 0.02 mole percent of rare earth ions and prepared according to the process described above, are shown below. The Sm or Tm ions act only as electron traps and the infrared stimulated emission spectra of the doubly activated phosphors of this invention agrees well with the fluorescent emission spectra of phosphors activated with the appropriate other single species of ions which are shown in the accompanying graphs. The fluorescent emission spectra of the doubly activated phosphors is an additive function of the fluorescent spectra of Sm or Tm and the other activator. The fluorescent emissions were obtained using 280 m$\mu$ excitation except that for SrS : Tb, Sm, 296 m$\mu$ excitation was used.

| Activators | Fluorescent Emission | Infrared Stimulated Emission |
| --- | --- | --- |
| Gd, Sm | Orange | Yellow-White (Very Bright). |
| Tb, Sm | ----do---- | Red (Bright). |
| Dy, Sm | ----do---- | Orange (Weak). |
| Ho, Sm | Pink | Yellow (Medium). |
| Er, Sm | Orange | Red (Weak). |
| Lu, Sm | ----do---- | Orange (Very Weak). |
| Tm, Sm | Red | Yellow (Weak). |
| Yb, Sm | Yellow-Orange | Green (Medium). |
| Ce, Tm | Blue-Green | Blue-Green (Bright). |
| Eu, Tm | Orange-Red | Orange-Red. |

The storage and optical properties of the examples give above agree well with the aforementioned interpretation proposed by Keller. Thus, for example, SrS : Tb, Sm is a phosphor which shows high stimulability and storage characteristics. According to the theory, since Tb exists as $Tb^{3+}$ in the activator state having a configuration of $4f^8$ and a ground state of $^7F_6$ and $Tb^{4+}$ has a configuration of $4f^7$ with its added stability, this ion would be a good hole trap during UV excitation. Holes would be trapped by $Tb^{3+}$ and the probability of electrons passing through the conduction band and being traped and stored at the $Sm^{3+}$ sites would be greatly enhanced, thus increasing the storageability of the phosphor. As a result, the decay rate of phosphorescence would be rapid and the phosphor would store mainly in the UV.

By a similar mechanism, as outlined in the above-mentioned publication, the phosphor SrS : Yb, Sm would store both in the blue and the UV. $Yb^{2+}$ with a $4f^{14}$ configuration and a ground state of $^1S_0$ would not be as good a hole trap as $Tb^{3+}$ and so the rate of decay of phosphorescence would be slow compared to $Tb^{3+}$ and the phosphor would store in the blue as well as in the UV regions.

While the primary use for the phosphors of this invention is as storage phosphors, the SrS : Tb, Sm phosphor shows an almost white fluorescence emission under UV activation which effect may be utilized to considerable advantage in luminescent viewing screens.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. Infrared stimulable phosphors consisting essentially of an alkaline earth sulfide base and 0.005–0.5 mol percent of one pair of activators selected from the group consisting of Gd—Sm, Ho—Sm, Ce—Tm, Eu—Tm and Yb—Sm.

2. A memory storage phosphor which exhibits a high degree of stimulability in the infrared consisting essentially of an alkaline earth sulfide base, doubly activated with 0.005–0.5 mol percent of Gd and Sm.

3. A memory storage phosphor which exhibits a high degree of stimulability in the infrared, consisting essentially of SrS doubly activated with 0.02 mole percent Gd and 0.02 mole percent Sm.

4. A memory storage phosphor which exhibits a high degree of stimulability in the infrared consisting essentially of an alkaline earth sulfide base doubly activated with 0.005–0.5 mol percent of Yb and Sm.

5. A memory storage phosphor which exhibits a high degree of stimulability in the infrared consisting essentially of SrS doubly activated with 0.02 mol percent Yb and 0.02 mol percent of Sm.

6. A memory storage phosphor consisting essentially of an alkaline earth sulfide base, doubly activated with 0.005–0.5 mol percent of Ce and Tm.

References Cited in the file of this patent

UNITED STATES PATENTS

| | | |
|---|---|---|
| 2,462,547 | Pitha | Feb. 22, 1949 |
| 2,522,074 | Urbach | Sept. 12, 1950 |
| 2,527,365 | Leverenz | Oct. 24, 1950 |

FOREIGN PATENTS

| | | |
|---|---|---|
| 650,458 | Great Britain | Feb. 28, 1951 |

OTHER REFERENCES

O'Brien: "Infra-Red Phosphors," pages 369–389, J. Optical Soc. Amer., vol. 36, No. 7 (July 1946).

Primak: "Infra-Red Phosphors," pages 1283–87, J. Amer. Chem. Soc., vol. 69 (June 1947).

Stripp: "Activation in SR-Infra-Red Phosphors," pp. 401–06, J. Amer. Chem. Soc., vol. 70 (January 1948).